United States Patent [19]

Cvacho

[11] Patent Number: 4,557,167
[45] Date of Patent: Dec. 10, 1985

[54] APPARATUS FOR TRIMMING A SCRAP RING FROM A CYLINDRICAL CONTAINER BODY AND METHOD OF OPERATION

[76] Inventor: Daniel S. Cvacho, 241 Kirkley Cr., Forest, Va. 24551

[21] Appl. No.: 637,530

[22] Filed: Aug. 3, 1984

[51] Int. Cl.[4] .......................... B23B 1/00; B23B 5/14
[52] U.S. Cl. .......................................... 82/47; 82/57; 72/71
[58] Field of Search .................. 82/47, 46, 48, 54, 55, 82/56, 57, 58; 72/71, 332, 334, 338

[56] References Cited

U.S. PATENT DOCUMENTS

| | | | |
|---|---|---|---|
| Re. 28,872 | 6/1976 | Larkin et al. | 113/7 R |
| Re. 30,746 | 9/1981 | Stroobants et al. | 82/56 |
| 545,131 | 8/1895 | Ohler | 82/57 |
| 1,605,924 | 11/1926 | Dodd | 82/54 |
| 2,397,603 | 4/1946 | Hackett | 164/10.6 |
| 2,787,174 | 4/1957 | Hyde | 76/104 |
| 3,166,965 | 1/1965 | Stemmler | 83/175 |
| 3,364,710 | 1/1968 | Rouyer et al. | 72/71 |
| 3,400,620 | 9/1968 | Armsbruster et al. | 82/47 |
| 3,425,251 | 2/1969 | Maytag | 72/71 |
| 3,578,761 | 5/1971 | Sarka | 83/343 |
| 3,581,691 | 6/1971 | Ringler | 113/120 |
| 3,595,455 | 7/1971 | Pace | 225/3 |
| 3,659,486 | 5/1972 | Criss et al. | 82/82 |
| 3,709,015 | 1/1973 | Loos | 72/71 |
| 3,724,302 | 4/1973 | Randich | 82/47 R |
| 3,756,103 | 9/1973 | Cvacho et al. | 82/101 R |
| 3,802,363 | 4/1974 | Langewis | 113/7 R |
| 3,838,653 | 10/1974 | Larkin et al. | 113/7 R |
| 3,864,995 | 2/1975 | Langweis | 82/54 |
| 3,875,833 | 4/1975 | Kannegiesser et al. | 82/82 |
| 3,994,251 | 11/1976 | Hake et al. | 113/7 R |
| 4,003,324 | 1/1977 | Tate et al. | 113/7 R |
| 4,014,228 | 3/1977 | Dean | 82/47 |
| 4,030,432 | 6/1977 | Miller et al. | 113/7 R |
| 4,181,050 | 1/1980 | Stroobants et al. | 82/56 |
| 4,404,836 | 9/1983 | Saunders | 72/332 |

Primary Examiner—Leonidas Vlachos
Attorney, Agent, or Firm—Richard P. Matthews

[57] ABSTRACT

An apparatus for trimming a scrap ring from a cylindrical container body and its method of operation. A cylindrical container body, closed at one end and provided with a flange member which extends substantially at right angles to the body at the opposite open end, has a scrap ring trimmed from the flange member. The container body is fed into one of a series of hemispherical pockets of a rotary turret and is then moved laterally thereto with the aid of a vacuum holder that engages the closed end. The open end of a container is presented to a main disk cutter that rotates about its axis continuously and which travels in alignment with one of the hemispherical pockets. A frusto-conical ram is mounted on the main disk cutter and is inserted into the open end of the container to insure its roundness. An auxiliary disk cutter, whose axis is substantially at right angles to the main disk cutter, is mounted on a reciprocable bar member along with a stripper plate. The auxiliary disk cutter engages the opposite side of the container flange that abuts the main disk cutter and is frictionally driven. Trim ring retainer segments mounted adjacent the pockets on the rotary turret cooperate with the stripper plate to hold a severed scrap ring until the auxiliary disk cutter and container body are withdrawn. The stripper plate is then moved away from the trim ring retainer segments permitting the scrap ring to fall into a collection bin. The disk cutters are so positioned and sharpened in such a manner that a cutting burr is transferred to the scrap ring leaving an extremely smooth edge on the flange of the container.

16 Claims, 17 Drawing Figures

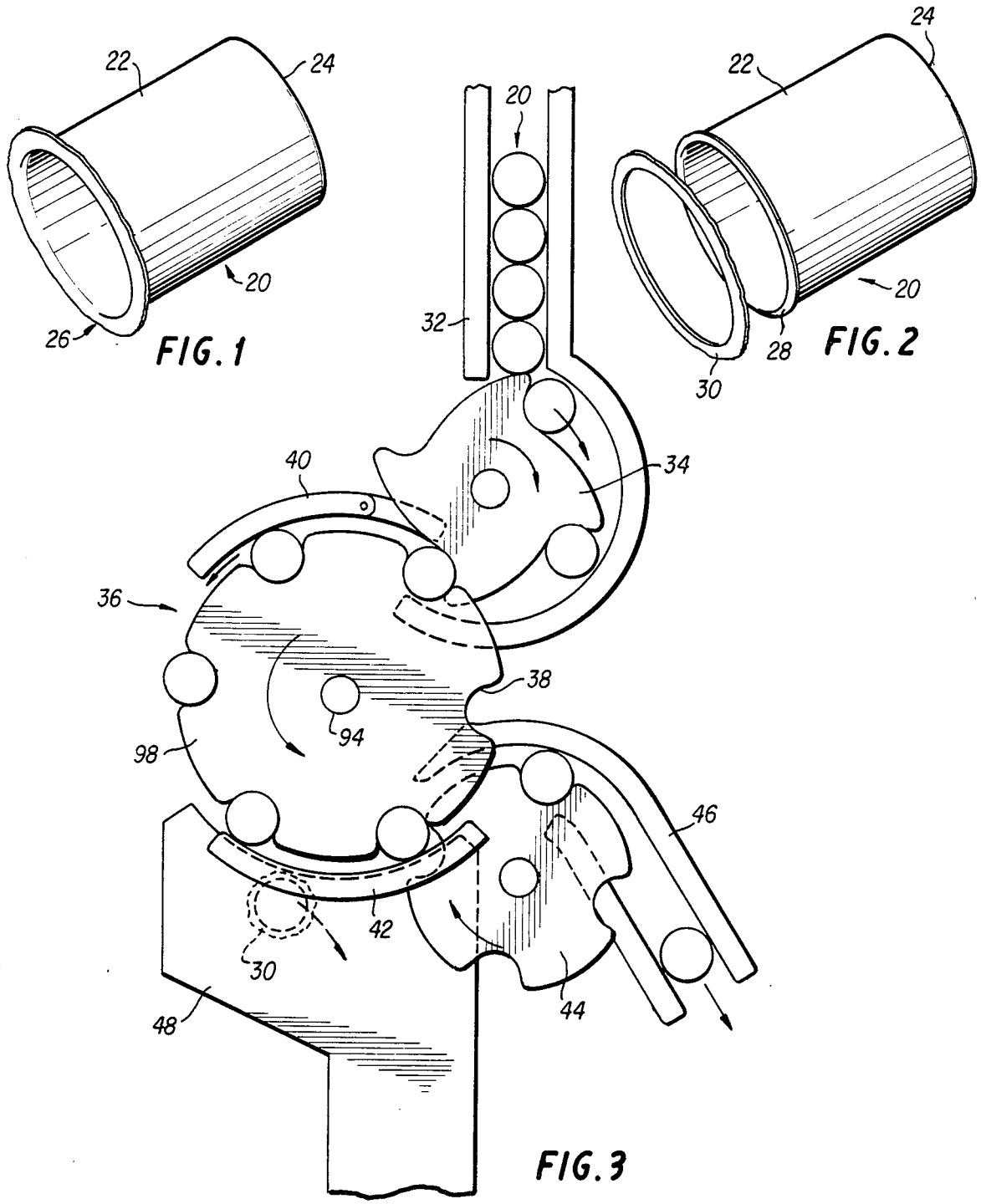

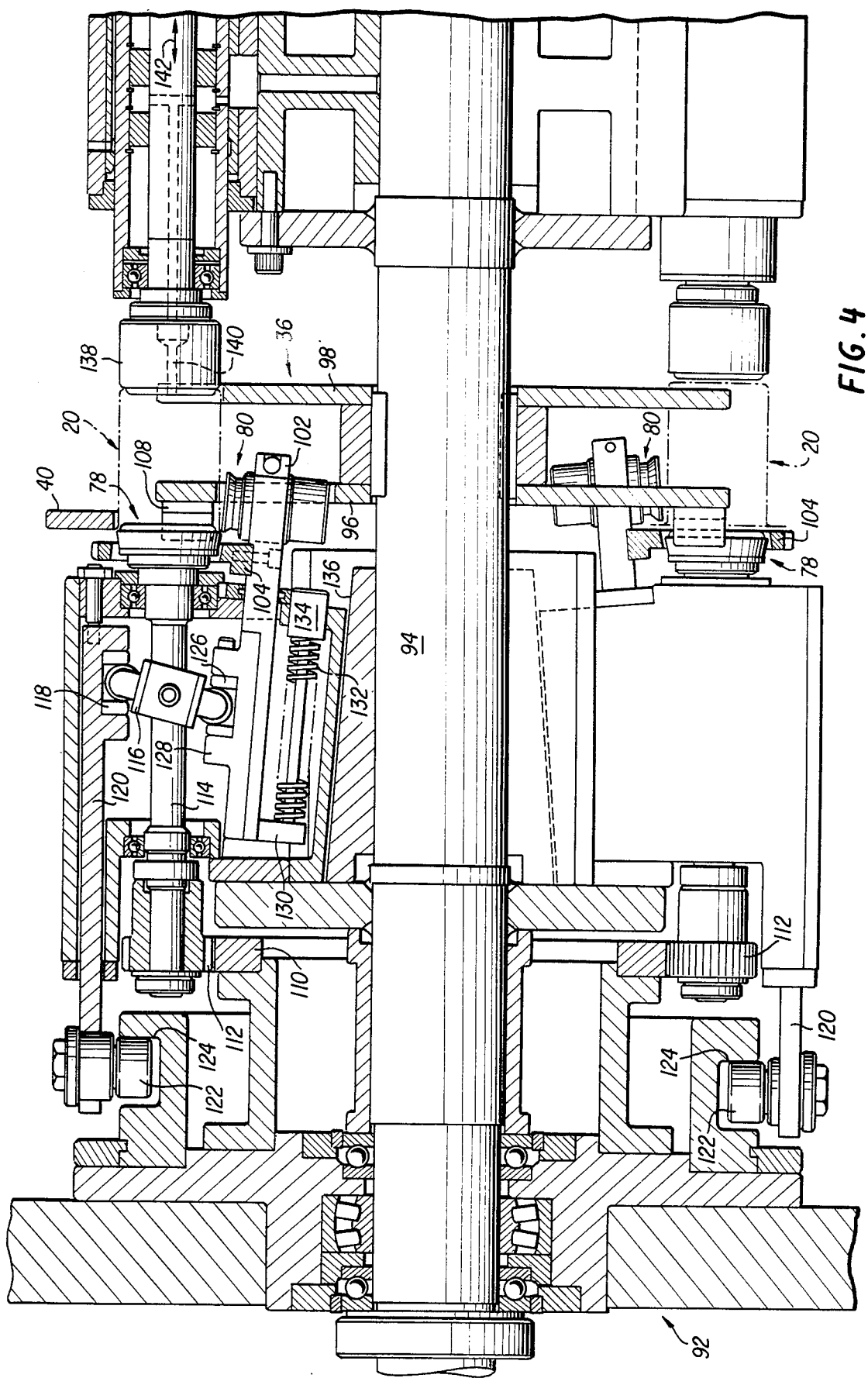

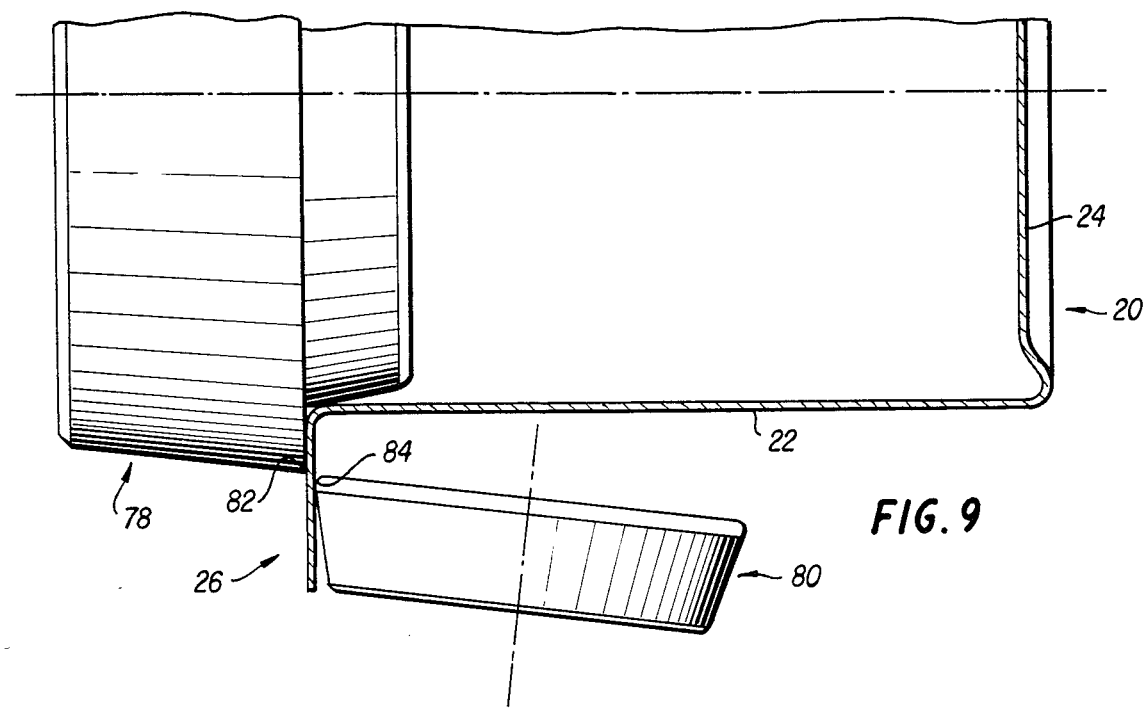
FIG. 9
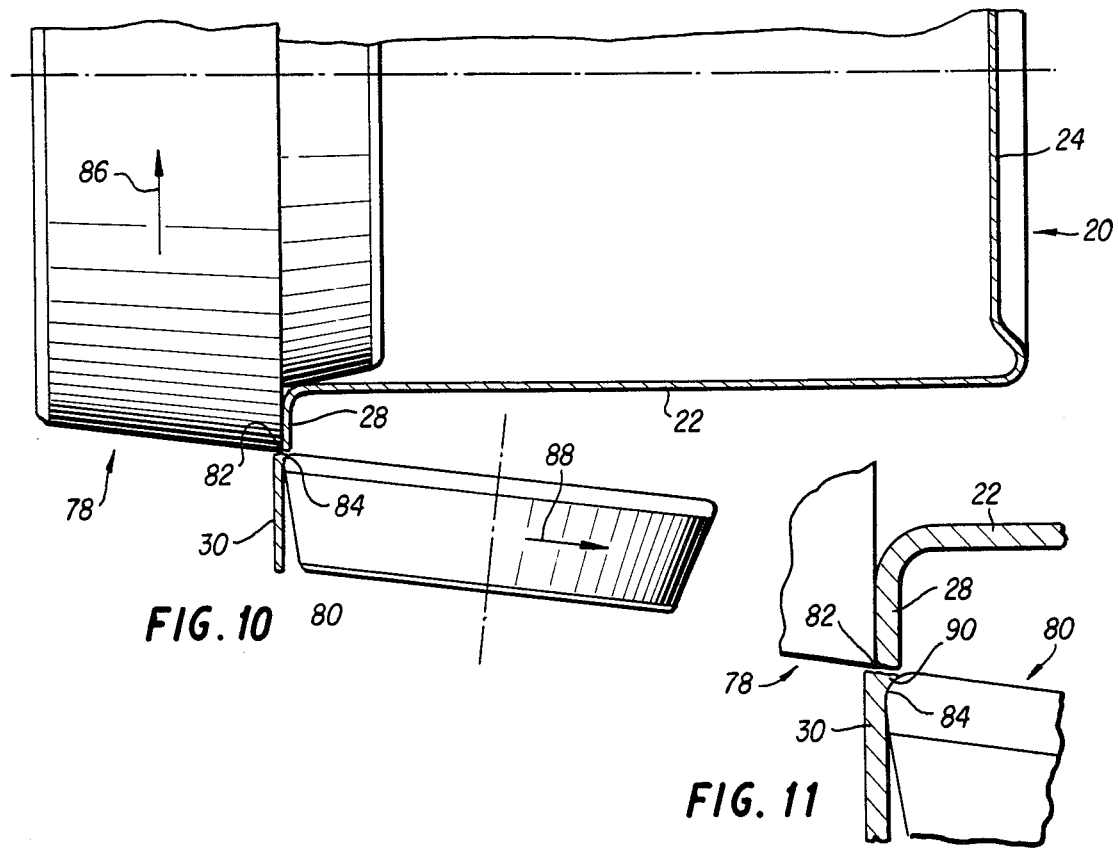
FIG. 10
FIG. 11

APPARATUS FOR TRIMMING A SCRAP RING FROM A CYLINDRICAL CONTAINER BODY AND METHOD OF OPERATION

This invention relates to a method of and apparatus for trimming a scrap ring from the flange of a metallic container body and, more particularly, to such a method and apparatus wherein the trimming knives or cutters are substantially at right angles to one another and wherein the burr developed during the trimming operation is transferred to the scrap ring.

Heretofore it has been known to cut a metal trim or scrap ring from the flange of a container body. It is most important in trimming the flange of the container that no burr be left on the flange. This is true because a can end is seamed to this flange and it is essential that any burr should not end up in the product especially where the product is food such as baby foods. These burrs are fragile and can easily be dislodged in the process of forming the can end. Sometimes the burr exists in the form of sharp sawtooth-like steps which can be broken off in handling and become commingled with the food product.

One method of removing burrs is illustrated in U.S. Pat. No. 3,994,251 Hake et al issued Nov. 30, 1976 wherein after the trimming operation the can is shifted axially onto a cylindrical surface and the burr is then ironed and fractured to remove it from the can body.

A U.S. Reissue Pat. No. 30,746 Stroobants et al reissued Sept. 22, 1981, also deals with the elimination of a burr on the trimmed flange of a container body. Specifically, the axis of the cutter blade is canted up to two degrees with the axis of the container being cut. While this prevents sharp sawtooth steps from forming on the flange and eliminates an inwardly directed burr, there is a very slight outwardly directed burr that remains.

Still another difficulty that exists in trimming scrap rings from container bodies is the handling and disposal of the scrap ring itself. A number of different solutions have been proposed in the known prior art.

For example, in U.S. Pat. No. 3,838,653 Larkin et al issued Oct. 1, 1974, a knurling roller is provided with teeth so that immediately after trimming, an endless ring of scrap is broken, knurled and then discarded.

In U.S. Pat. No. 4,014,228 Dean issued May 29, 1977, a fixed cutter blade engages a scrap annulus to cut the annulus into an open ring.

SUMMARY OF THE PRESENT INVENTION

In accordance with the present invention the foregoing difficulties and shortcomings of the known prior art are effectively overcome. In particular, with respect to the leaving of a burr on the flange of the container, this problem is solved in accordance with the present invention by transferring the undesirable burr from the flange of the container to the trim ring itself. A pair of disk cutters are employed whose longitudinal axes are generally perpendicular to one another. By maintaining one of the cutters sharp and by applying a radius to the cutting edge of the other cutter it becomes possible to transfer the burr to the scrap ring thereby eliminating the burr problem.

The main rotary turret is provided with trim ring retainer segments which cooperate with a stripper plate to grip or clamp the scrap ring permitting the vacuum withdrawal of the container body. Thereafter, the stripper plate is moved away from the scrap ring permitting it to fall by gravity into a suitable collection bin.

The invention also includes the additional feature of sizing or rounding out the container body in the vicinity of the flange area immediately prior to cutting the trim or scrap ring from the container to avoid cutting slivers or other uneven cuts. This re-shaping of the container is effected by the insertion of a frusto-conical ram-like member into the open end of the container.

The inherent advantages and improvements of the present invention will become more readily apparent upon reference to the following detailed description of the invention and by reference to the attached drawings wherein:

FIG. 1 is a perspective view of a container body prior to the trimming operation of the present invention;

FIG. 2 is a perspective view of the container body of FIG. 1 after scrap ring has been separated therefrom;

FIG. 3 is a fragmentary schematic view of the container handling and scrap ring separation of the present invention;

FIG. 4 is a fragmentary front elevational view of the container trimming apparatus taken partially in vertical cross section;

FIG. 9 is a fragmentary elevational view taken partially in vertical cross section showing the FIG. 7 method of cutting as applied to the disk cutters of the present invention;

FIG. 10 is a fragmentary elevational view taken partially in vertical cross section similar to FIG. 9 but showing a subsequent position;

FIG. 11 is a fragmentary elevational view taken partially in vertical cross section showing the flange area of the container of FIG. 10 but drawn to an enlarged scale;

DETAILED DESCRIPTION OF THE INVENTION

Figure 5:
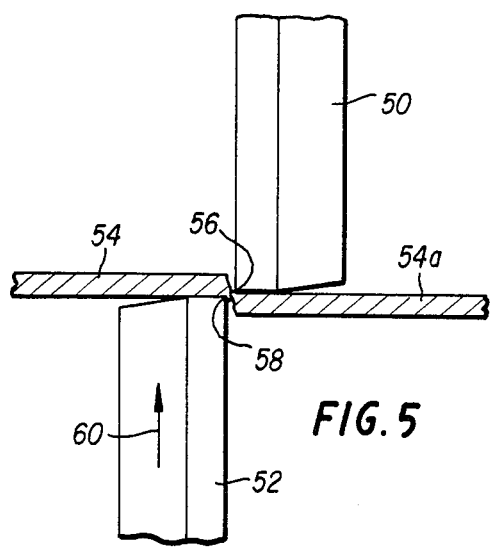
FIG. 5 is a fragmentary elevational view taken partially in vertical cross section showing a prior art method of cutting.

Referring now to FIG. 1 of the drawings, there is indicated a cylindrical container body designated generally at 20, having a cylindrical body wall 22. The container is closed at one end by a bottom wall 24 and open at its other end where a rough flange, indicated generally at 26, exists prior to the trimming operation. After the container has been trimmed, this rough flange provides a trimmed flange 28 and a scrap ring 30 as is illustrated in FIG. 2.

FIG. 3 schematically represents the handling of a container body 20 as it is subjected to the trimming operation of the present invention. Thus, a stack of can bodies 20 are received in an infeed stacking or chute means 32 from which the can bodies are fed sequentially by gravity to an infeed star wheel 34 where they are individually separated and then transferred to a pocket 38 of a main rotary turret 36. The pockets 38 are each substantially hemispherical in order to cradle a cylindrical can body 20 therein. An infeed safety gate is provided at 40 and an outfeed safety gate is provided at 42 to ensure retention of the can bodies within the pockets of the turret 36.

In a specific embodiment, a container is transferred from star wheel 34 and deposited into a pocket of main turret 36 in the first quadrant of main turret 36. With the quadrants numbered counterclockwise, this leaves approximately 35 degrees of counterclockwise rotation available before main turret 36 reaches its second quadrant. Substantially the entire second quadrant of rotation is available for the trimming operation. In the specific embodiment, trimming occurs during the central 70 degrees of this quadrant leaving 10 degrees of rest on each side thereof.

For the first 35 degrees of rotation in the third quadrant, the can is returned to its stripping position. In the following 55 degrees of rotation in the third quadrant, the trim or scrap ring 30 is stripped from the container and injected into a scrap discharge duct 48. In approximately the first 45 degrees of rotation in the fourth quadrant, the container is moved without its scrap ring to a discharge star wheel 44 from whence it is ejected into a discharge chute 46 to a can handling conveyor for further processing.

Figure 6:
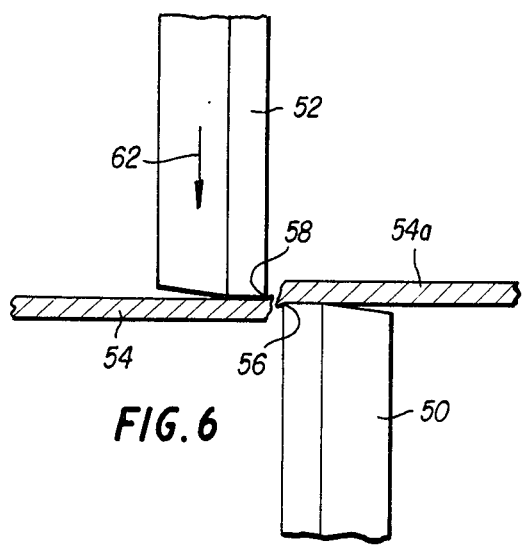
FIG. 6 is a fragmentary elevational view taken partially in vertical cross section showing another prior art method of cutting.

Referring now to FIGS. 5 and 6, there are illustrated two prior art techniques for cutting or punching metal. A portion of a metal strip is shown at 54 to be cut or punched by knives or punches 50, 52 each of which are provided with sharp cutting edges 56, 58 respectively. In the FIG. 5 embodiment, the knife or punch 52 is moving in the direction of arrow 60. Assuming that the portion 54a is the main metal part and the portion 54 is to be the scrap piece, it will be observed that a burr is left on the main metal part 54a on its top side and a burr on the lower side of the scrap piece 54. Similarly, in FIG. 6 both knives or punches are provided with sharp edges at 56 and 58 as before and with the knife or punch 52 moving in the direction of arrow 62, a burr is left on the bottom side of the main metal part 54a and another burr is left on the top side of the scrap portion 54.

Figure 7:
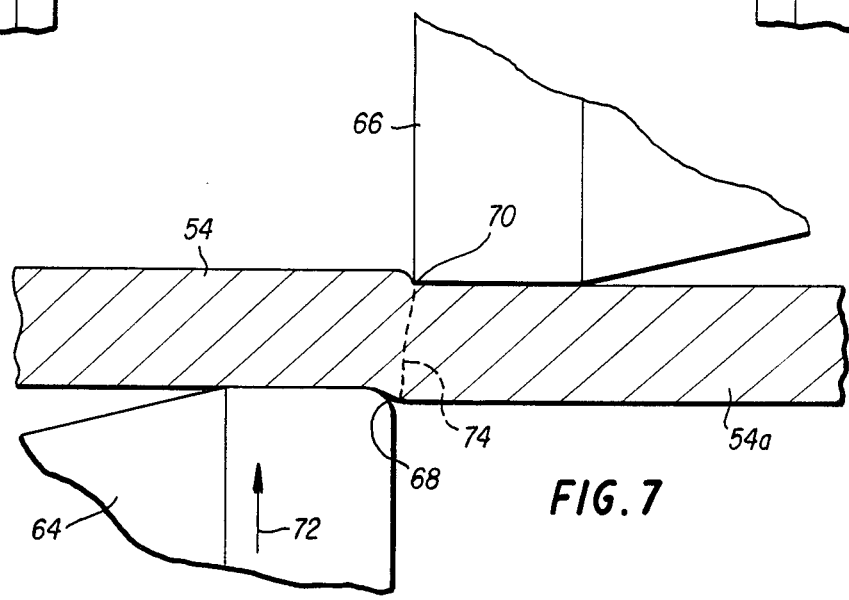
FIG. 7 is a fragmentary elevational view taken partially in vertical cross section illustrating the method of cutting in accordance with the present invention.
Figure 8:
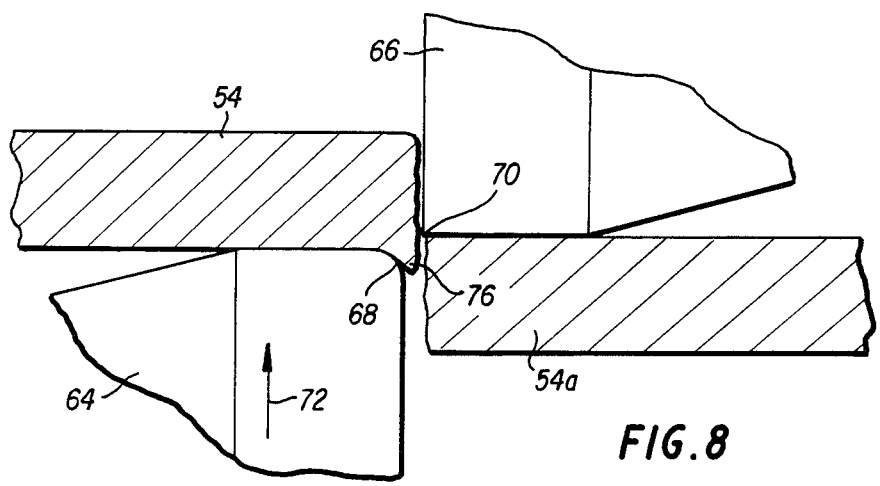
FIG. 8 is a fragmentary elevational view taken partially in vertical cross section similar to FIG. 7 but showing a subsequent position.

A preferred method of cutting in accordance with the present invention is illustrated in FIGS. 7 and 8. Once again portion 54 of a metal strip constitutes the waste or scrap portion and the portion 54a indicates the portion of the metal to be saved or used. Cutter or punch member 64 is provided with a radius on its cutting edge at 68 whereas cutter or punch member 66 is provided with a sharp cutting edge 70. The cutting or punch members 64, 66 are offset laterally from about 0.001 inches to about 0.060 inches and the cutter or punch member 64 is moving in the direction of arrow 72. The metal strip 54, 54a initially bends as is illustrated in FIG. 7 and a line of shear force is shown by the dotted line 74 which extends substantially from the sharp cutting edge 70 to a portion spaced to the right of the radius on cutting edge 68 along an auxiliary radius adjacent thereto. The center of curvature for this auxiliary radius is sharp point 70. Progressive movement of the cutter or punch member 64 in the direction of arrow 72 shears metal strip 54 from the metal strip 54a portion and leaves a downwardly extending burr 76 on the scrap portion 54 leaving the upper portion of the metal 54a with a substantially smooth corner or edge.

This cutting technique is employed in the present invention as is schematically illustrated in FIGS. 9–11. In FIG. 9 a main disc cutter, indicated generally at 78, is provided with a sharp cutting edge 82. An auxiliary disc cutter 80 whose axis is substantially at right angles to the axis of main disc cutter 78 but is tilted slightly to the right to permit the flange portion 28 of the container 20 to clear the auxiliary disc cutter 80 as the can body 20 is moved to the right following the cutting or trimming operation. By providing the auxiliary disc cutter 80 with a radius on its cutting edge 84 the scrap ring 30 is provided with a burr 90 as shown in FIG. 11 while the trimmed flange 28 remains burr free. The main auxiliary cutter 78 is rotating in the direction of arrow 86 and the auxiliary disc cutter 80 is rotating by frictional engagement with the undersurface of the rough flange 26 in the direction of arrow 88. As in the illustration of FIGS. 7 and 8, the main disc cutter 78 is offset from about 0.001 inches to about 0.060 inches vertically upwardly with respect to auxiliary disc cutter 80.

Referring now to FIG. 4 of the drawings, there is illustrated a can trimming apparatus which is provided with frame means indicated generally at 92 and means, not shown, for driving a main drive shaft 94. As is evident in this figure, the main rotary turret 36 is provided with spaced parallel plates 96, 98 with a plate 96 which is nearest the main disc cutter 78 and the auxiliary disc cutter 80 being provided with a cutout 100 as is seen more clearly in the enlarged view of FIG. 12 in order to permit passage therethrough of the auxiliary disc cutter 80. One main disc cutter 78 and one auxiliary disc cutter 80 is associated with each pocket 38 of the main rotary turret 36 and each pair of cutters rotate in unison and continuously with the main rotary turret 36.

The auxiliary disc cutter 80 is carried by a reciprocable bar 102 which presents the auxiliary disc cutter 80 substantially at right angles to the main disc cutter 78. The auxiliary disc cutter 80 is shown tilted slightly downwardly to the right in order to permit the trimmed flange of the container, shown in phantom at 20 in FIG. 4, to pass to the right after the trimming operation and thereby clear the position of the auxiliary disc cutter 80. Also mounted on the reciprocable bar 102 is a stripper plate 104, which is shown in greater detail in FIG. 12, for purposes of stripping the scrap ring 30 from the container body 20 in a manner to be described thereinafter.

Figure 12:
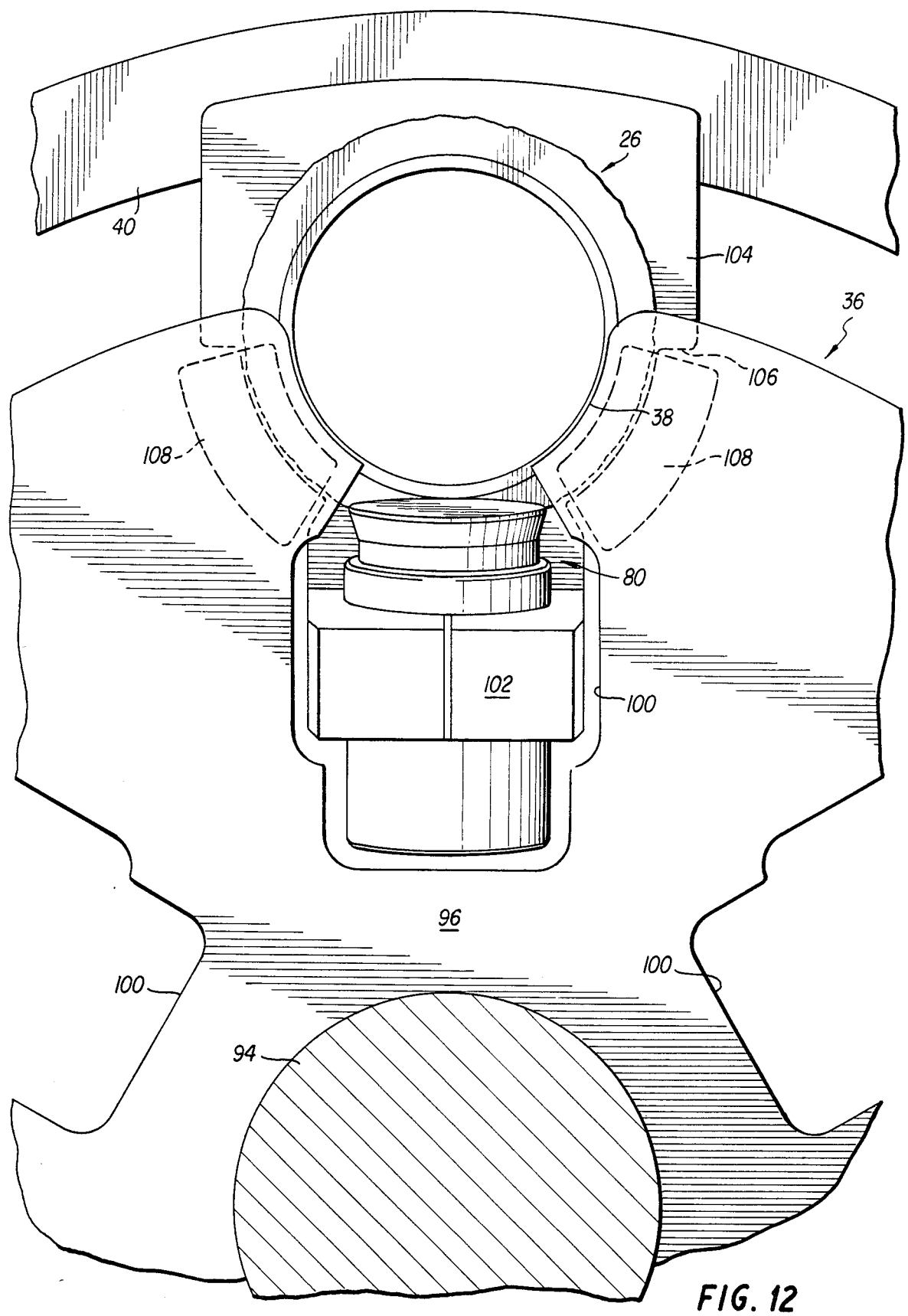
FIG. 12 is a fragmentary elevational view taken partially in vertical cross section showing a pocket construction of the main rotary turret and drawn to an enlarged scale.

As seen most clearly in FIG. 12, the stripper plate 104 has a cut away portion 106 on each side thereof to permit passage of one leg of an L-shaped trim ring retainer segment 108 which is also illustrated in FIG. 4 and FIGS. 13-17. There are two trim ring retainer segments 108 associated with each pocket 38 of the main rotary turret 36.

The main disc cutter 78 is driven continuously by a gear chain which includes a ring gear 110 fixedly mounted to shaft 94 which meshes with gear 112 thereby driving shaft 114 of the main disc cutter 78. Shaft 114 extends through a hollow swivel member 116 with a bushing member 118 received in a follower rod 120 which is reciprocated in a predetermined manner by cam follower 122 which engages a stationary cam 124. Similarly, the other end of hollow swivel member 116 there is provided a bushing 126 in an insert boss 128 which is mounted on and reciprocated with reciprocable bar 102. A depending flange 130 on reciprocable bar 102 provides an end mounting for a heavy spring member 132 the opposite end of which is supported by abutment member 134. The entire assembly rotates about tapered roller bearing 136 that is preferably mounted in cartridge form at each of the pockets 38 and the main turret 36.

The container 20 when received in the pocket of the main turret 36 has its closed end 24 engaged by a vacuum chuck 138. A vacuum line 140 is shown in FIG. 4 and it provides a gripping force for movement of the container laterally with respect to the main turret 36. A shaft overrun for the vacuum chuck 138 is provided in a manner similar to that illustrated with respect to the cam 124, cam follower 122 and spring loading provided by cam 132. The shaft overrun provides an aubtting force from 200 to 250 lbs. and it compensates for different can heights of up to approximarely 0.030 inches in variation. This shaft overrun is indicated by the double-headed arrow 142 in FIG. 4.

Figure 13:
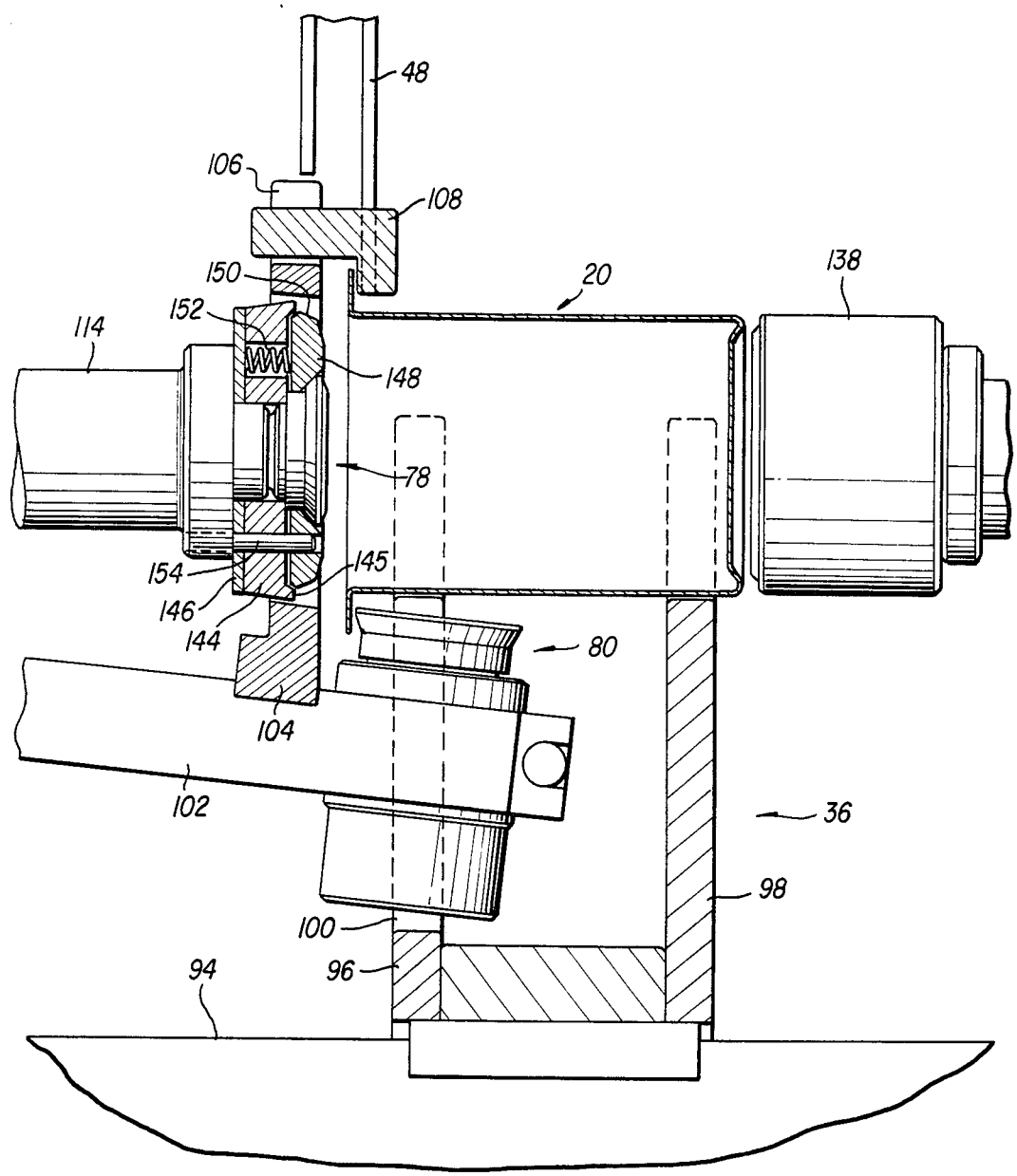
FIG. 13 is a fragmentary elevational view taken partially in vertical cross section illustrating the loading position for the container onto the main rotary turret.

The operation of the can trimming functions of the present invention will be explained with respect to the detailed disclosure contained in FIGS. 13-17. FIG. 13 illustrates the loading position of the container when it is received from the infeed star wheel 34 into a pocket 38 of the main rotary turret 36. Vacuum chuck 138 engages the bottom of the container 20 and moves the container laterally with respect to the main rotary turret 36.

Figure 14:
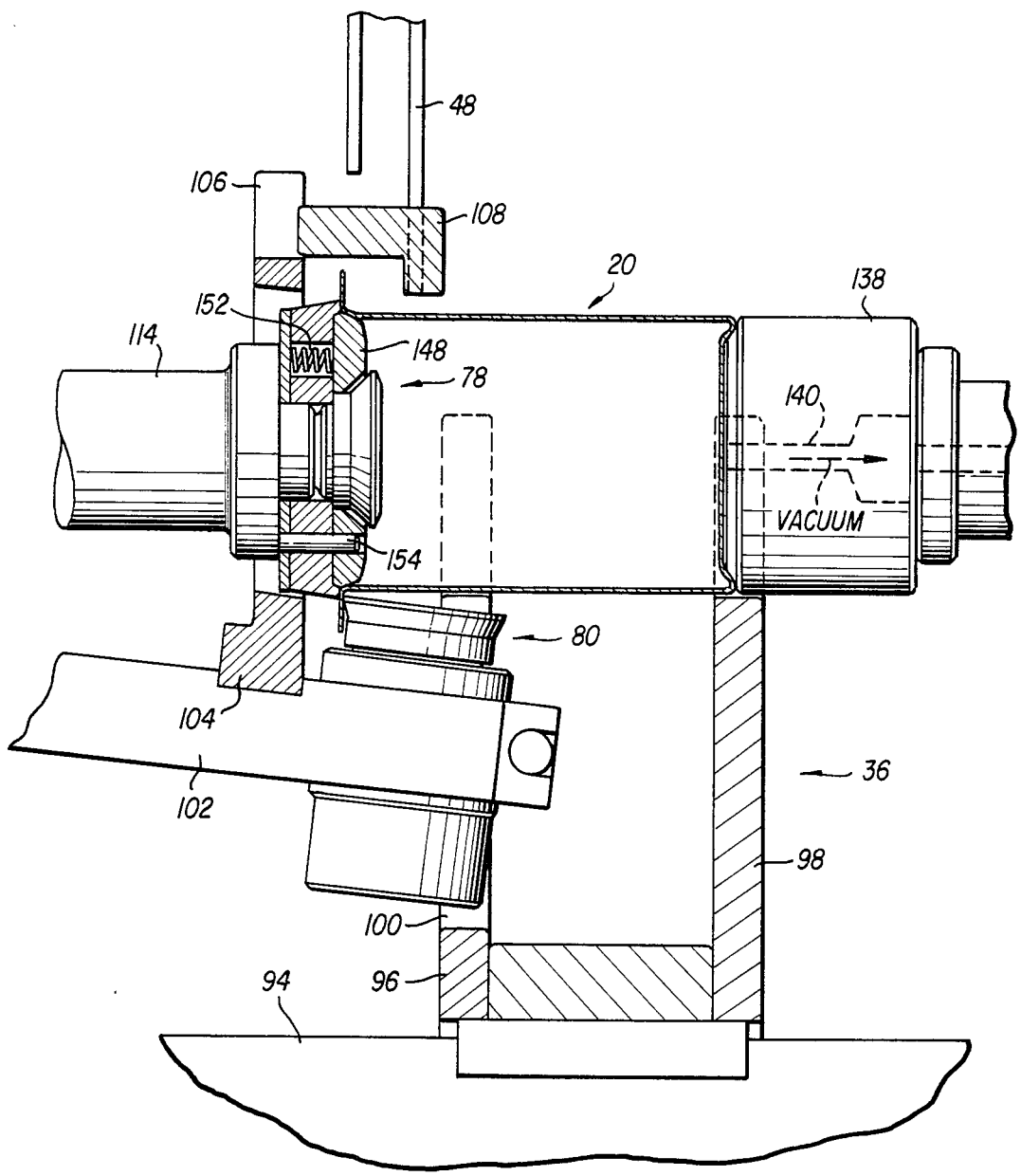
FIG. 14 is a fragmentary elevational view taken partially in vertical cross section illustrating the cutting position for the container.

Some of the details of the main disc cutter 78 are illustrated in FIG. 13. For example, the disc cutter itself is designated 144 and the face of the disc cutter is indicated at 145. A spacer ring 146 mounted beneath the disc cutter 144, compensates for wear on the knife itself. A frusto-conical ram member 148 has a frusto-conical surface 150 for sizing the can to assure that the flange maximum variations are from 0.001 to 0.003 inches. The frusto-conical ram member 148 is spring mounted with the aid of springs 152 of which three are employed and one of which is shown in FIGS. 13 and 14. A dowel pin 154 prevents rotation of the ram member 148 with respect to the disc cutter 144.

In moving from the loading position of FIG. 13 to the cutting position in FIG. 14, the vacuum chuck engages the bottom of container 20 and moves it to the left in these figures transversely of the main rotary turret 36. The container is sized and thereby corrected for an oval or out-of-round condition by engagement with the frusto-conical surface 150 on the frusto-conical ram member 148 immediately prior to the can's engagement with the face 145 of the disc cutter 144.

Immediately following the presentation of the flange of container 20 to the face 145 of the disc cutter 144, the reciprocable bar 102 controlled by cam 124 moves to the left reaching the position of FIG. 14. An override resulting in the stretching of spring 13 brings the auxiliary cutting disc 80 into contact with the underside of the flange of the container and the override exerts a pressure of from 200 to 250 psi and thereby frictionally drives the auxiliary cutter 80. The disc cutters 78, 80 are rotated for slightly more than one revolution to sever the scrap ring. The cutting edge of the disc cutter 144 is maintained sharp by lapping the surface thereof, whereas the cutting edge of the auxiliary cutter 80 is provided with a radius in the manner shown at 84 in FIGS. 9-11. This effectively transfers the burr to the scrap ring in the manner illustrated in FIG. 11.

Figure 15:
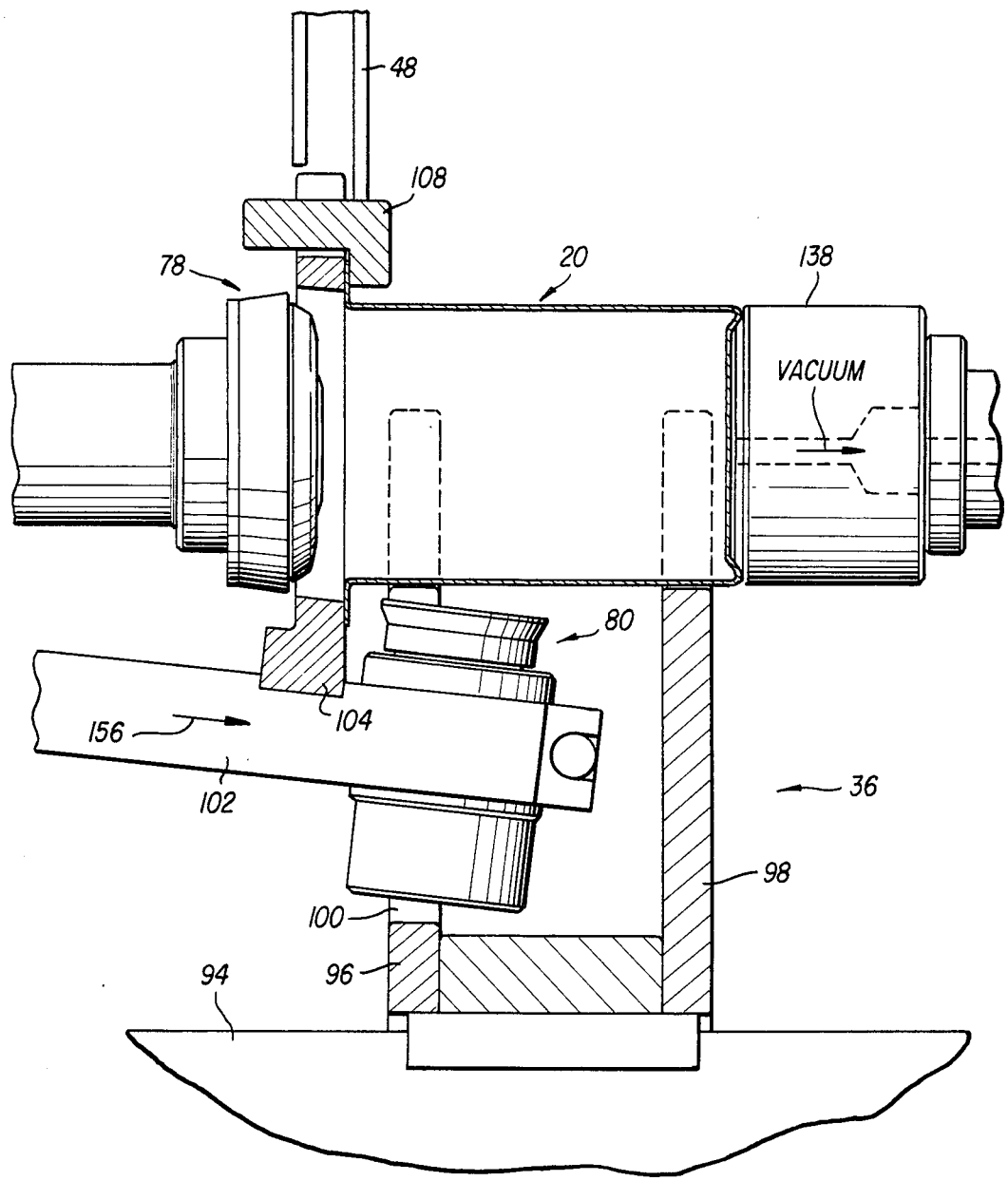
FIG. 15 is a fragmentary elevational view taken partially in vertical cross section showing the container stripping position.

The apparatus is then moved to the strip position illustrated in FIG. 15. In this position reciprocable bar 102 is moved in the direction of arrow 156 which concurrently removes the auxiliary cutter 80 from engagement with the underside of the flange area of container 20 and also brings stripper plate 104 on the reciprocable bar 102 to the position shown in FIG. 15. In this manner the scrap ring is clamped between the stripper plate 104 and the cooperating trim ring retainer segments 108.

Figure 16:
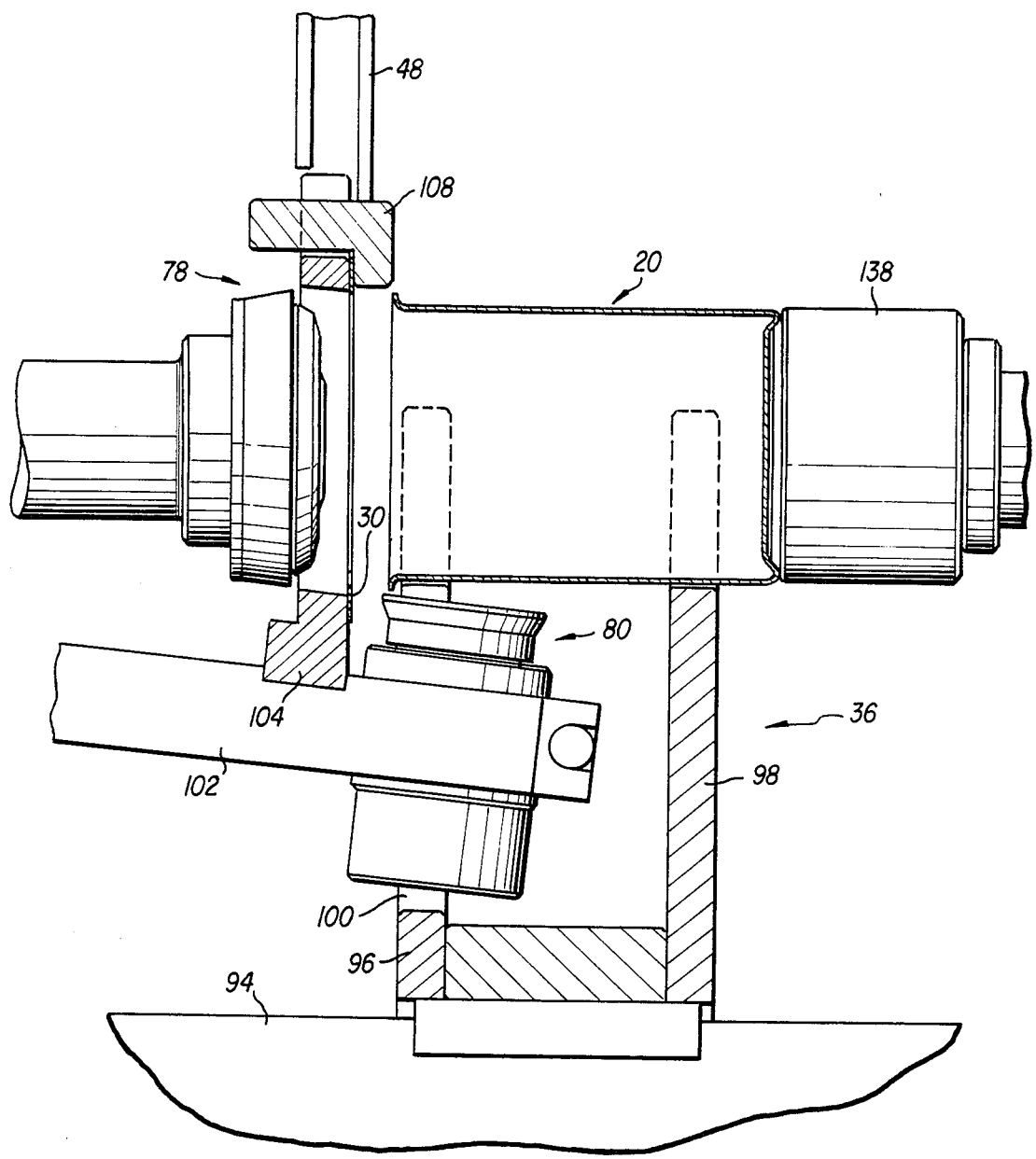
FIG. 16 is a fragmentary elevational view taken partially in vertical cross section showing the vacuum withdrawal of the container.
Figure 17:
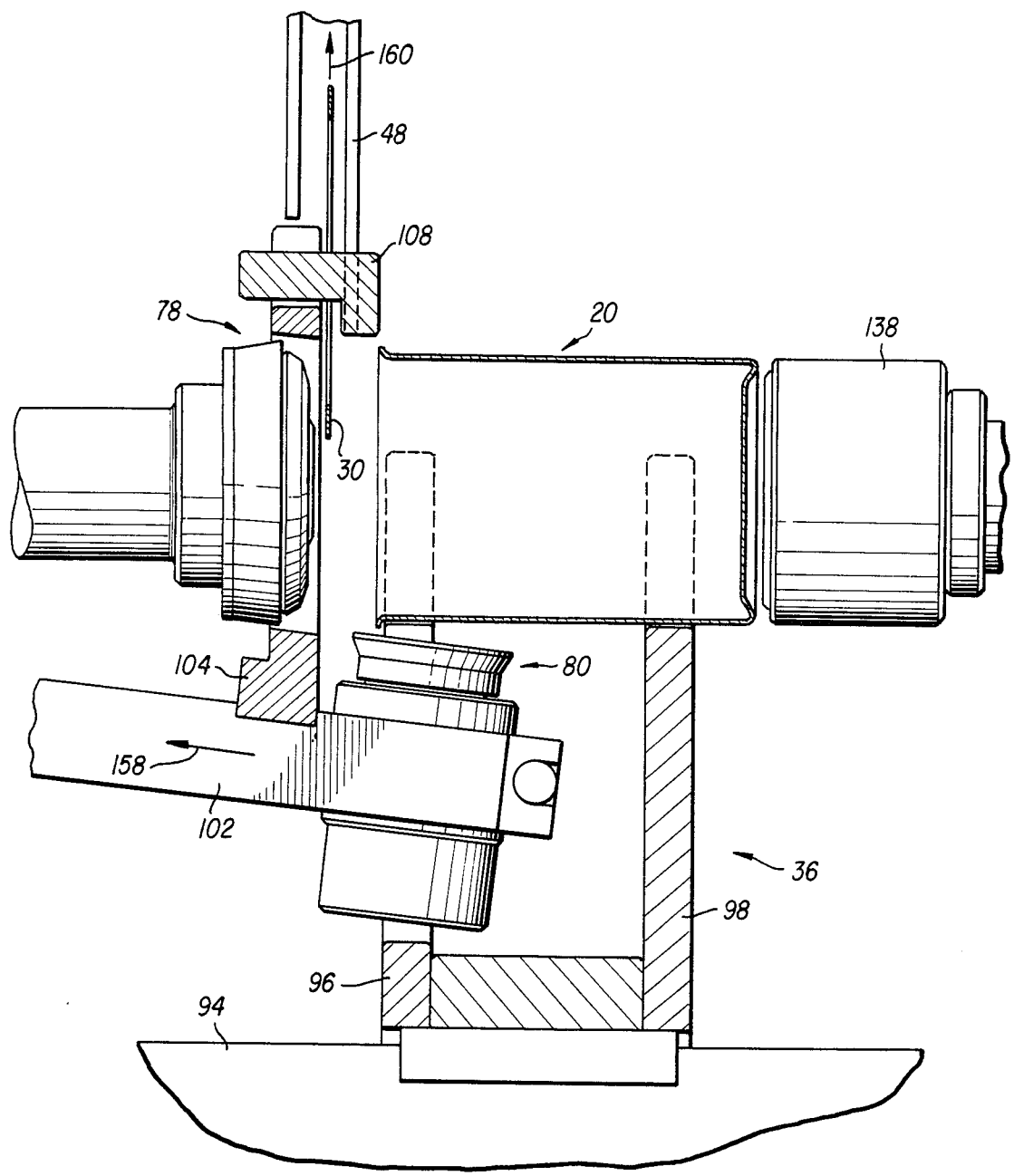
FIG. 17 is a fragmentary elevational view taken partially in vertical cross section showing the ejection of the scrap ring.

Vacuum is maintained in the vacuum chuck 138 continuously during this time and the container 20 is then withdrawn laterally with respect to the main rotary turret, that is, to the right in FIG. 16, leaving the scrap ring 30 held in position between the pinching or clamping action of stripper plate 104 in cooperation with the trim ring retainer segments 108. Notice that the angle that the auxiliary disc cutter 80 makes with respect to the vertical permits the container flange and body to pass freely over the top of the auxiliary disc cutter 80 as viewed in FIG. 16. The vacuum is then released within the vacuum chuck 180 leaving the can positioned on the main rotary turret 36. The reciprocable bar 102 is moved leftwardly in FIG. 17 as indicated by arrow 158, thereby withdrawing the stripper plate 104 and permitting the scrap ring 30 to fall into the trim ring discharge chute 48 as indicated by arrow 160. This occurs with the aid of gravity, but for purposes of illustration the trim ring discharge chute has been rotated through an arc to permit its display. The auxiliary knife is then moved to its initial loading position and the chuck 138 is moved into its load position to pick up another container to repeat the sequence.

The vacuum sequence throughout this process is believed to be evident from the foregoing discussion but this brief summary will summarize the sequence of operations. First, the vacuum comes on to pick up the container and push it onto the main knife or cutting disc. Secondly, the vacuum may stay on during the cutting operation. Thirdly, the vacuum is on to withdraw the finished can to its discharge position. Fourth, the vacuum cuts off when stripping the finished can out of the main rotary turret to allow its removal. Fifth, the vacuum is off until the sequence repeats.

The knives or cutting discs of the present invention may be resharpened simply by lapping. All drawn and re-drawn food cans and any can requiring a trimmed flange may be trimmed in accordance with the present invention. The centering device is important for various can diameters to assure that no sliver will be developed since the can will move on the face of the main knife or cutting disc. Thus, the disc will take care of out-of-round cans and various can diameters.

While presently preferred embodiments of the invention have been illustrated and described, it will be recognized that the invention may be otherwise variously embodied and practiced within the scope of the claims which follow.

I claim:

1. An apparatus for trimming a scrap ring from a cylindrical container body having one closed end, said scrap ring being part of a container flange member which extends substantially at right angles to said cylindrical container body, said apparatus comprising:
   a. a rotary turret member having generally hemispherical pocket members for receiving, transporting and discharging cylindrical container bodies;
   b. a rotary disk trim ring cutter assembly associated with at least one of said pocket members; said rotary disk trim ring cutter assembly comprising
      (1) a main disk cutter aligned with a pocket member of said rotary turret member,
      (2) means to rotate said main disk cutter about its longitudinal axis continuously during the cutting operation,
      (3) an auxiliary disk cutter having its longitudinal axis substantially perpendicular to the longitudinal axis of said main disk cutter,
      (4) reciprocable bar means for holding said auxiliary disk cutter in position to engage the under surface of said scrap ring and flange,
      (5) and means for reciprocating said bar means;
   c. vacuum holding means engageable with said closed end of said container body for controlling the movement of said container body laterally with respect to said rotary turret to move the upper surface of said flange of said container body into and out of engagement with said main disk cutter;
   d. and stripping means to strip said scrap ring from the flange of said container body.

2. An apparatus for trimming a scrap ring as defined in claim 1 wherein a rotary disk trim ring cutter assembly is associated with each pocket of said rotary turret member.

3. An apparatus for trimming a scrap ring as defined in claim 1 wherein said rotary turret includes spaced parallel plate-members and at least one of said parallel plate members has a portion thereof removed to receive said reciprocable bar means.

4. An apparatus for trimming a scrap ring as defined in claim 1 wherein said auxiliary disk cutter is driven by frictional engagement with the underside of said scrap ring and container flange member.

5. An apparatus for trimming a scrap ring as defined in claim 1 wherein said stripping means includes stripper plate means mounted on said reciprocable bar means movable in unison with said auxiliary cutter disk.

6. An apparatus for trimming a scrap ring as defined in claim 5 including a pair of trim ring retainer segments mounted adjacent each pocket of said rotary turret with each pair of trim ring retainer segments cooperating with an associated stripper plate means to hold said trim ring and prevent said trim ring from becoming entrapped on said container body.

7. An apparatus for trimming a scrap ring as defined in claim 1 including a frusto-conical ram member spring mounted on the face of said main disk cutter for insertion into the open end of said container body to effect roundness of said container body adjacent said flange member prior to said trimming operation.

8. An apparatus for trimming a scrap ring as defined in claim 7 wherein said frusto-conical ram member is provided with means to prevent rotation thereof with respect to said main disk cutter.

9. An apparatus for trimming a scrap ring as defined in claim 1 wherein said reciprocable bar means is spring loaded.

10. An apparatus for trimming a scrap ring as defined in claim 1 include means mounted on said rotary turret for cooperating with said stripping means to hold said trim ring and prevent said trim ring from becoming entrapped on said container body.

11. An apparatus for trimming a scrap ring as defined in claim 1 including means associated with said vacuum holding means to effect an overrun in the movement of said container body and thereby compensate for differences in the length of said container body.

12. A method of trimming a trim ring from a flange member of a cylindrical can body having one closed end which comprises the steps of
   a. feeding said can body into a pocket formed in a rotary turret which rotates continuously during the trimming operation,
   b. holding said can body with a vacuum applied to said closed end of said can body,
   c. moving said can body laterally with respect to said pocket into engagement with a rotating main disk cutter,
   d. following said can body in its movement laterally of said pocket with an auxiliary disk cutter whose axis of rotation is substantially at right angles to the axis of said main disk cutter,
   e. overfeeding said auxiliary disk cutter against resilient pressure means to cause said auxiliary disk cutter to rotate by frictional engagement with the underside of said flange member,
   f. severing a trim ring from said flange member,
   g. gripping said trim ring between trim ring holding segments mounted on said rotary turret with said holding segments engaging one side of said trim ring and a stripper plate member movable into engagement with the other side of said trim ring,
   h. removing said can body from said trim ring by moving it toward said pocket while said trim ring is being held,
   i. and releasing said trim ring by moving said stripper plate away from said trim ring holding segments.

13. A method of trimming a trim ring as defined in claim 12 including the additional step of associating a main disk cutter and an auxiliary disk cutter with each pocket of said rotary turret and rotating said cutters in unison with said rotary turret.

14. A method of trimming a trim ring as defined in claim 12 including the additional step of tilting the axis of said auxiliary cutter slightly toward the pocket on said rotary turret from which the can body is received to facilitate clearance of said flange of said can body past said auxiliary disk cutter after severing said trim strip from said can body.

15. A method of trimming a trim ring as defined in claim 12 including the additional step of offsetting the axis of said auxiliary disk cutter from the point of tangency with said main disk cutter, said offset being in the direction of rotation of said main and auxiliary disk cutters of from about 0.001" to about 0.060" while concurrently maintaining a sharp cutting edge on said main disk cutter but providing a radius on the cutting edge of said auxiliary disk cutter and thereby transferring a burr developed from said trimming operation to said trim ring.

16. A method of trimming a trim ring as defined in claim 12 including the additional step of inserting a frustoconical ram member into said cam body while moving said can body laterally with respect to said pocket and prior to its engagement with said rotating main disk cutter thereby eliminating any out of round condition of said can body in the vacinity of the flange area prior to the trimming operation.

* * * * *